Figure 6:
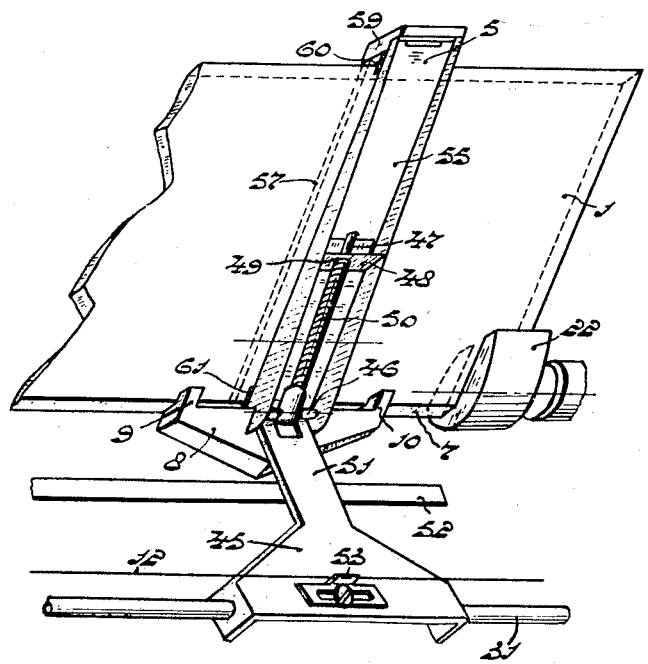

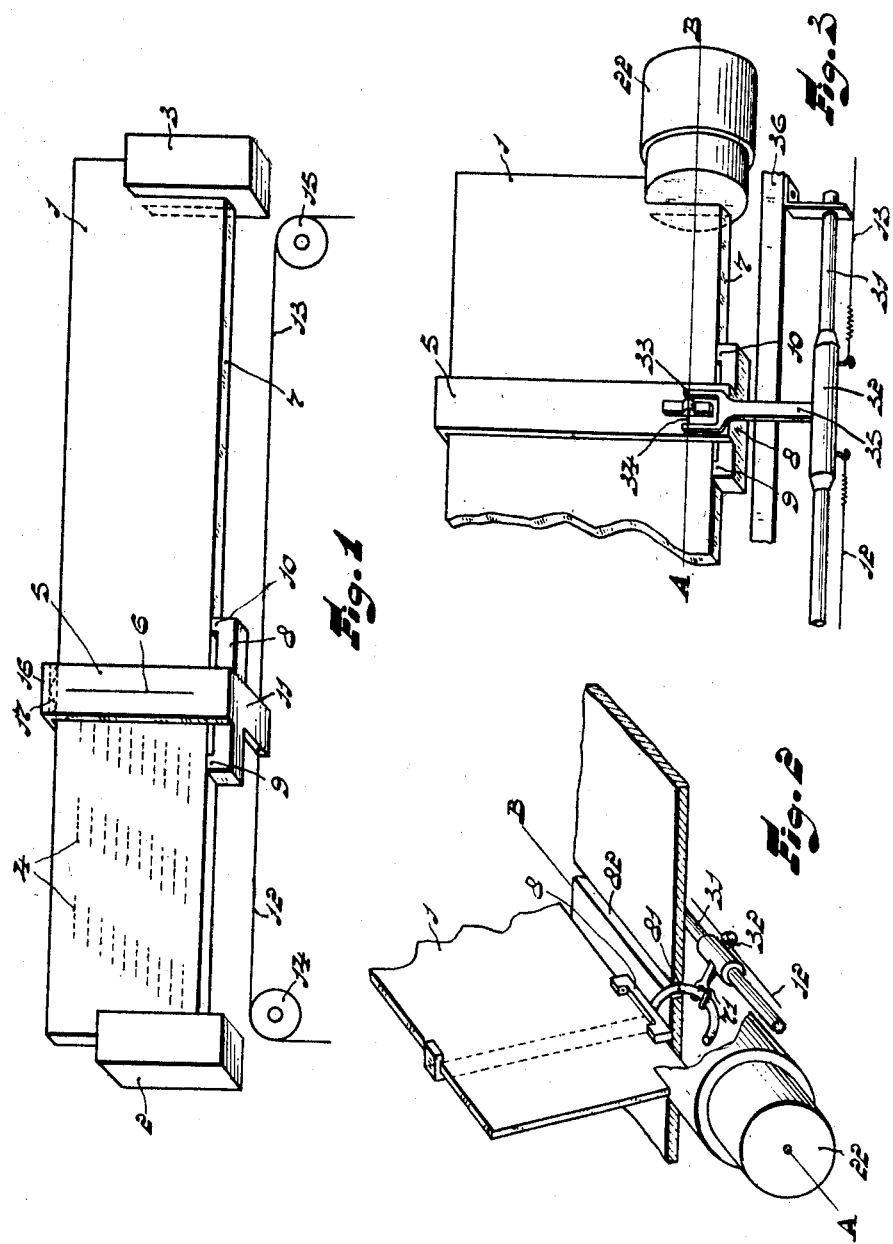

Jan. 15, 1952     M. J. GROENENBERG     2,582,380
TUNING APPARATUS FOR RADIO RECEIVER AND THE LIKE
Filed April 24, 1946     3 Sheets-Sheet 2
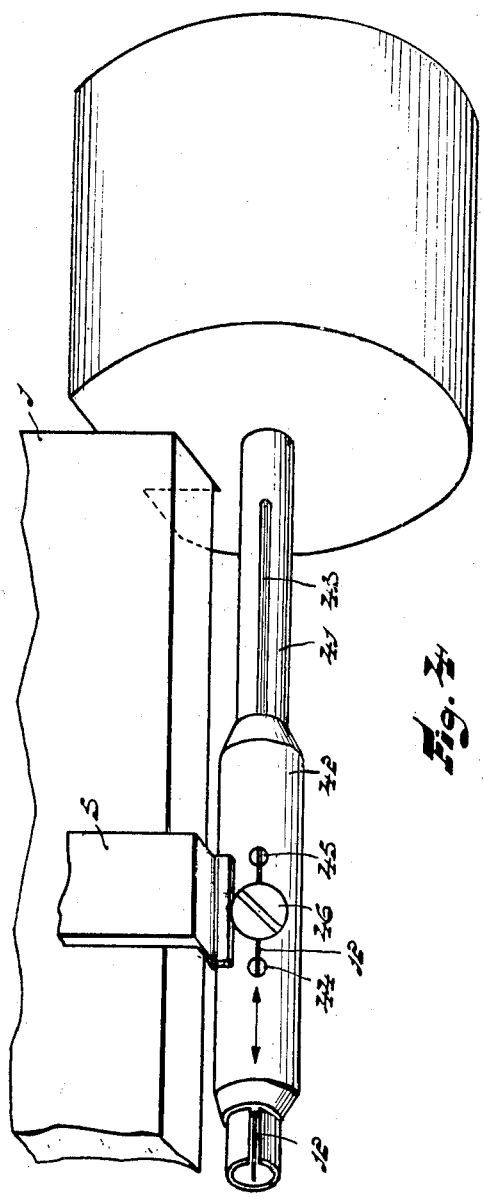
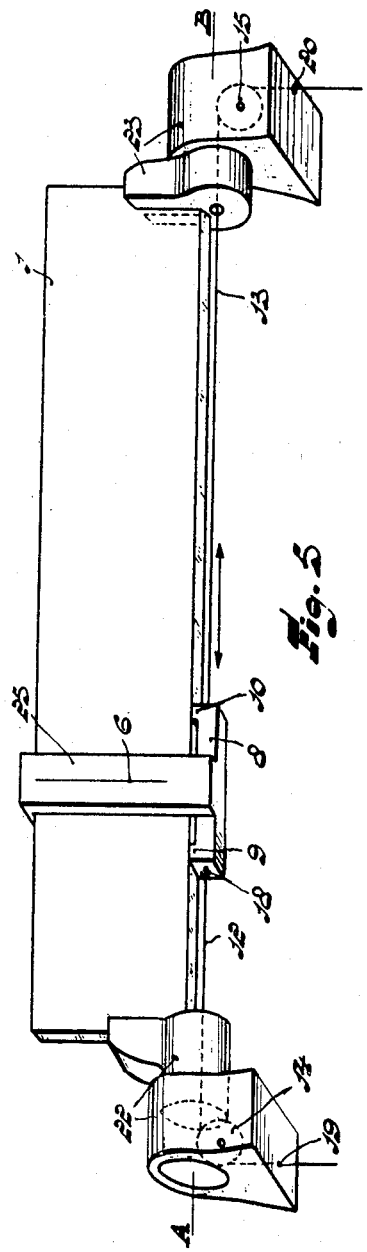
*INVENTOR.*
MAARTEN JAN GROENENBERG
BY
ATTORNEYS Jan. 15, 1952  M. J. GROENENBERG  2,582,380
TUNING APPARATUS FOR RADIO RECEIVER AND THE LIKE
Filed April 24, 1946  3 Sheets-Sheet 3

INVENTOR.
MAARTEN JAN GROENENBERG
BY
Wenderoth, Lind & Ponack
ATTORNEYS

Patented Jan. 15, 1952

2,582,380

UNITED STATES PATENT OFFICE 2,582,380

TUNING APPARATUS FOR RADIO
RECEIVERS AND THE LIKE

Maarten Jan Groenenberg, Eindhoven, Netherlands, assignor, by mesne assignments, to Hartford National Bank and Trust Company, Hartford, Conn., as trustee Application April 24, 1946, Serial No. 664,494
In the Netherlands February 24, 1942

Section 1, Public Law 690, August 8, 1946
Patent expires February 24, 1962

5 Claims. (Cl. 116—124.1)

In a wireless set use is universally made of a scale with an associated pointer adapted to be moved along the surface of the scale by driving mechanism. In this case the scale and the pointer jointly serve as a wavelength indicator and for this purpose the scale is provided with a wavelength division or the like. The position of the pointer always corresponds with a given position of the tuning device proper and the standard practice is to gang the pointer and the said tuning device by a tensioned draw-cord.

In order to guide the pointer parallel with the scale the existing constructions comprise a runway generally formed in the shape of a rod along which a guide-shoe forming part of the extension of the pointer is moved by means of the draw-cord. By choosing the dimensions of the guide-shoe in the direction of movement to be sufficiently large, sufficiently accurate parallel movement of the pointer may be ensured. Similar indicators may be used with other apparatus such as measuring oscillators or the like.

The use of such a separately arranged runway with guide-shoe, however, involves complications and hence supplementary cost and the invention has for its object to avoid such complications and supplementary loss or at least to reduce them materially. Other advantages will be clear from the description given hereinafter with reference to so-called swing-scales, that is to say those scales which are adapted to be rotatably moved relative to the cabinet of the set about an axis parallel to the direction of movement of the pointer. In this case the pointer must be free to follow the rotation of the swing-scale and this may be ensured by providing the pointer or the extension thereof with a pivot. With such swing-scales the invention has also for its object to provide an accurate parallel guiding of the pointer relatively to the scale irrespective of the position of the scale, even when the axis of rotation of the scale does not coincide with the axis of the pivot.

According to the invention, the runway of the pointer is formed by a side of the scale along which runs a guide-shoe which constructionally forms part of the pointer.

Particular advantages as regards simplicity and solidity of construction are obtained by applying this inventional idea to an indicator in which the scale is constituted by a flat plate for example of glass two sides of which are alone embraced wholly or in part by a frame if the runway of the pointer is constituted by an edge of the plate that stands free.

The invention also has important advantages if applied to so-called swing-scales, that is to say scales which are rotatable in relation to the cabinet of the set about an axis parallel to the direction of movement of the pointer. In this case, the pointer must be free to follow the rotary movement of the swing-scale although it must remain coupled to the drive mechanism and the indication must remain accurate. It is self-explanatory that these desiderata can be excellently satisfied by guiding the pointer along a side of the scale itself.

One favourable embodiment is characterized in that the draw-cords are arranged in the axis of rotation of the swing-scale across whose pivots they disappear into the cabinet of the set. It is thus ensured in a very simple manner that the rotation of the scale does not affect the position of the pointer. In the device according to the invention this may in addition be solved in a particularly elegant manner if the runway is constituted by a tube inside which the cord passes whilst at the same time the linking of cord and guide-shoe passes through a slit of the said tube.

The arrangement according to the invention renders it possible in a simple manner to house the drive mechanism for the pointer practically entirely within the cabinet and this offers an important structural advantage in a number of cases.

In a favourable embodiment this is ensured due to the fact that the drive mechanism for the pointer is so coupled to an arm of the pointer projecting into the interior of the cabinet, as to drive it.

With forms of constructions which even have to meet higher requirements it is preferable that a relatively movable member adapted to move along a separate runway external to the axis of rotation of the scale should be coupled to the pointer so as to move the said member with the said pointer.

Further refinements which may be used with advantage will be clear from the descriptions given hereinafter with reference to the figures.

In order that the invention may be clearly understood and readily carried into effect it will now be described more fully with reference to the accompanying drawing, in which figures from 1 to 7 represent differing modifications of the indicator according to the invention.

Figure 1 shows a scale of a wireless set constituted by a flat plate 1 which may be made for example of glass. This scale is partly embraced on the short sides by frames 2 and 3. The scale may carry the station names, as is schematically designated by 4. An index 6 provided on a pointer 5 permits the reading off of the station to which it is tuned.

The pointer 5 is guided by the underside 7 of the scale 1. For this purpose, the pointer is constructed on the underside as a guide-shoe 8 having two projecting lugs 9 and 10 which are arranged on either side of the centre of the pointer and which slide along the underside of the scale. In the modification shown the pointer 5 is provided with an arm 11 which projects into the set for example through a slot in the panel of the cabinet. The drive mechanism for the pointer is coupled to the arm 11 so as to drive it by means of a draw-cord 12, 13 which may be moved by the tuning device when actuated over guide-rollers 14, 15 in opposite directions.

In this case, the guide-rollers 14, 15, the draw-cords 12, 13 and the part of the arm 11 to which these cords are secured may be housed entirely in the cabinet of the set, whereas the scale 1 and the pointer part 5 are arranged on the outside of the cabinet.

In order that the lugs 9 and 10 may be forced resiliently against the underside 7 of the scale the pointer is so constructed that its upperside embraces the upperside of the scale as indicated by 16, a slightly bent blade-spring 17 being inserted between the upperside of the scale and the part 16 of the pointer.

According to the invention, a sufficiently accurate parallel guiding of the pointer relatively to the scale is thus obtained without the necessity for a separate runway and guide-shoe construction.

Figure 2 shows a form of construction in which the pointer is driven from an arm projecting into the cabinet, the scale being constructed as a swing-scale.

The scale 1 is rotatable on a shaft AB and for this purpose pivots are provided one of which is schematically represented at 22 in partly cutaway condition.

The arm 81 connected to the pointer is shaped in the form of part of a circular arc whose centre is located on the axis of rotation AB.

Internally of the cabinet is arranged a separate runway which is external to the axis of rotation of the scale and is formed in the shape of a rod 31 and a simple relatively movable member 32 which is adapted to be shifted by a draw-cord 12. In addition, the sliding member 32 carries an extension piece 71 terminating in a two-pronged fork in which the arm of the pointer shaped in the form of a circular arc is free to rotate so that the sliding member is coupled to the pointer so as to move it with it.

This arm projects into the cabinet of the set through a slit 82 formed in the panel thereof.

Due to the fact that the centre of the arm 81 is located on the axis of rotation of the scale the arm 81 will in any position of the swing-scale be free to move through the slit 82 and in the fork 72, whilst at the same time the pointer is always driven by the sliding member 32.

As a result of the guiding of the pointer by the underside of the scale itself accurate parallel guiding of the pointer is ensured in spite of the very simple and solid construction.

Figure 3 is a rear elevation of one embodiment of the invention in which the partly illustrated scale 1 is constructed as a swing-scale. For this purpose the scale is mounted in pivots 22 arranged on either side of the scale. As before, the pointer 5 is guided by the underside 7 of the scale and a relatively movable member 32 moving along a separate runway 31 is provided. In this embodiment the latter member is coupled to the pointer 5 by means of a pivot 33 so as to drive it.

In the construction shown the axis of this pivot coincides with the axis about which the scale is rotated so that if the sliding member 32 is moved by means of the draw-cords 12 and 13 the pointer 5 is moved with it in any position of the swing-scale. In this embodiment practically the entire drive mechanism is housed within the cabinet and the arm 35 of the sliding member projects inside across a slot in the panel 36.

The spindle 34 of the pivot 33 may be constructed as a resilient small steel wire by which the lugs 9 and 10 are forced against the underside 7 of the scale. As distinguished from the construction shown in figure 1 the reaction point of the resilient steel wire 34 is quite independent of the scale. The advantage thus realised may be recognised as follows. In the embodiment shown in figure 1 the spring 16 slides with friction along the upperside of the scale. Due to the fact that both the upperside and the underside are subject to friction the pointer tends to rock around an axis perpendicular to the plate of the scale and this tendency can only be sufficiently limited by making the guide-shoe equally long as the pointer.

In the embodiment shown in figure 3 the guide-shoe runs with friction against the runway only, whereas the upperside of the pointer stands entirely free with the result that the tendency to rocking is greatly reduced so that in this case the length of the guide-shoe may be small compared with the height of the pointer. In the present embodiment this is made effective by using a considerably wider scale.

The fact that in this embodiment use is made not only of the usual sliding member 32 and the runway 31 but also of the guiding of a guide-shoe 8 which is integral with a pointer and which is guided by the underside of the scale itself ensures accurate parallel guiding of the pointer relatively to the scale irrespective of the position of the scale and the runway 31 and the sliding member 32 may be of simpler construction and have considerably smaller dimensions than in the case of well-known constructions.

In the embodiment shown in Figure 4 and for the sake of clearness illustrated on a larger scale the invention is also applied to a swing-scale, the underside of the partially shown scale being provided with a runway 41 for the guide-shoe 42 of the pointer 5 and the axis of the runway coinciding with the axis of rotation of the scale. This runway is constructed as a tube internally of which is arranged the draw-cord 12. The tube has formed in it a slit 43 and the linking between the draw-cord and the guide-shoe passes across the said slit. For this purpose the draw-cord 12 is passed through apertures 44 and 45 formed in the guide-shoe 42 and through the slit 43 to the external surface of the guide-shoe and secured thereto by means of a screw 46 in such manner that any movement of the draw-cord is followed by the guide-shoe. This draw-cord may be passed into the interior of the cabinet of the set, for example by guide-wheels mounted in the pivots. The runway 41 always follows the rotation of the swing-scale so that, since the axis of rotation coincides with the axis of the runway, satisfactory guiding of the pointer in any position of the scale is ensured. Owing to the fact that in this embodiment a considerable part of the drive mechanism of the pointer is external to the cabinet of the set a considerable saving in space in the cabinet is achieved without the aesthetical properties of the appearance being detrimentally affected.

The same advantage is achieved in the construction shown in figure 5 in which the scale is also rotatable in relation to the cabinet of the set about an axis parallel to the direction of movement of the pointer. For this purpose, this scale is mounted in two pivots 22, 23 arranged on either side of the scale. The axis of rotation of the scale falls along the line A—B. In this embodiment the drive mechanism is coupled to the pointer by means of two draw-cords 12, 13 which are secured thereto on either side of the guide-shoe by means of hooks 18.

In addition, this embodiment of the invention the draw-cords are also arranged in the axis of rotation of the swing-scale. For this purpose the guide wheels 14, 15 are arranged internally of the pivots and the draw-cords disappear into the interior of the cabinet through apertures 19 and 20 formed in the said pivots. Thus very simple and accurate parallel guiding of the pointer is obtained and as before a considerable saving in space is achieved owing to the fact that part of the drive mechanism is not housed in the cabinet.

Figure 7:
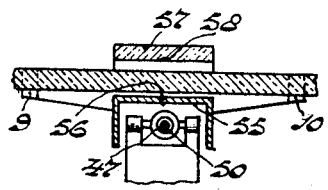

Figures 6 and 7 also show a swing-scale construction to which the invention is applied. The embodiment shown in the present case comprises a sliding member 45 adapted to move on a separate runway 31 and provided with an arm 51 which in turn engages the pivot 46 of an extension piece shaped in the form of a stud 47. The stud 47 is coupled to the pointer 5 so as to drive it; the axis of rotation of the scale does, however, not coincide with the axis of the pivot 46. In addition, the pointer has arranged on it at its rear side 55 a joggle 48 normal to the plane of the pointer and in the direction of movement of the pointer, said joggle having formed in it a bore 49 which is traversed by a stud 47. The construction is such that the stud 47 is adapted to move the pointer with it in the direction of movement of the pointer practically without any play but to move in a direction normal thereto relatively to the pivot. A helical spring 50 between the joggle 48 and the pivot 46 forces the pointer against the surface of the scale and against the underside of the scale which serves as a runway. By this spring the arm 51 of the sliding member 45 which projects through a slit in the panel of the cabinet is also urged against the edge 52 of this slit. According to the invention, this edge is coated with a material which is practically not subject to wear and the opposite edge of the slit may be provided with a yielding dust-proof sealing shaped for example in the form of a brush band. The draw-cord 12 is clamped to the sliding member 45 in a clamping device 53 which permits adjustment of the pointer relatively to the cords. Intermediate the surface of the scale and the pointer are arranged at 60 and 61 pieces of felt in order to avoid the occurence of scratches on the pointer or on the scale.

In this embodiment the advantage of accurate parallel guiding of the pointer in any position of the swing-scale is realised even if, as has been effected deliberately in the present case, the axis of rotation of the scale and the axis of the pivot of the pointer do not coincide. In addition, the reaction point of the spring 50 is again arranged so as to be independent of the scale and this permits of the width of the guide-shoe 8 being very small compared with the height of the scale.

Figure 7 is a sectional view taken normally to the direction of length of the pointer on the line 7—7 of figure 6. The rear side 55 of the pointer is preferably of non transparent material, for example black lacquered thin metal on which an index dash 56 is provided on the side adjacent the scale plate 1. The front side 57 of the pointer is of transparent material, for example trolitule, and also carries an index dash 58 on the side adjacent the scale plate. A parallax-proof reading may be obtained in known manner by taking care in reading that the index dash 56 on the rear part of the pointer is in register with the index dash 58 on the front side of the pointer.

The guide-shoe proper which should preferably be made of soft material so as to ensure an easy travel along the underside of the scale may also be made of a clear plastic and in a practical form of construction the front side of the pointer 57 and the guide-shoe 8 form a unitary piece in which the rear side of the pointer 55 is mounted, the front and rear side of the pointer being united on the upperside by a small hood 59 which is also of a clear plastic.

In the standard swing-scale constructions the axis of rotation of the scale must coincide with the pivot points of the pointer in order to avoid torsion and due to the finite thickness of the scale and of the pointer pivot the axis of rotation is external to the scale. In such constructions this necessarily involves comparatively bulky pivot constructions. The construction shown in figures 6 and 7 enables the use of pivots of smaller compass, due to the fact that it is possible for the axis of rotation to be located in the scale. This is rendered possible in that on the one hand the stud 47 moves the pointer itself with it in its direction of movement without play but on the other hand is adapted to move endwise through the aperture 49 in the direction of length of the pointer. When the scale turns backward and hence in Figure 6 towards the observer the stud 47 will be pushed upward through the aperture 49 through a small distance, whereas the contrary occurs when the scale turns forward. The advantage of the construction shown stands out even more clearly when the scale illumination is effected by means of light dissipated in the scale by total reflection by means of small illuminating lamps. In the form of construction shown in figure 6 the latter may be arranged concentrically in the pivots, whereas in known constructions in which the axis of rotation of the scale and the axis of the pointer pivot have to coincide the eccentric arrangement of the scale plate results in the lamps having also to be placed eccentrically and thus leads, to even larger dimensions of the pivots.

In addition, it is obvious that since the parallel guiding of the pointer is ensured by the guide-shoe 8 it is possible for the runway 31 and the sliding member 45 to be of simpler and lighter construction than if they would form the guide for the pointer itself.

I claim:

1. Tuning apparatus for a radio receiving set, comprising a pair of support members mounted in spaced apart relation on the said set and respectively provided with bushings rotatable about a given axis, an oblong tuning dial plate having its end portions mounted on said bushings for a limited degree of rotary movement therewith and having uncovered upper and lower edge surfaces arranged parallel to said axis, a guide-shoe member, a pointer connected to said guide-shoe member, said guide-shoe member abutting said lower surface and said lower surface constituting a guide-path for the said guide-shoe, and belt-like means for moving said guide-shoe and therewith said pointer along the said guide-path.

2. Tuning apparatus for a radio receiving set, comprising a pair of support members mounted in spaced apart relation on the top of the said set and respectively provided with bushings rotatable about a given axis, a flat oblong tuning dial plate having its end portions mounted on said bushings for a limited degree of rotary movement therewith and having uncovered upper and lower edge surfaces arranged parallel to said axis, a guide-shoe member, a pointer member connected to said guide-shoe member, said pointer member comprising an opaque portion arranged at the rear of said dial plate and a transparent portion arranged at the front of said dial plate, said guide-shoe member abutting said lower surface and said lower surface constituting a guide-path for the said guide-shoe, and belt-like means for moving the said guide-shoe member and therewith the said pointer along said guide path.

3. Tuning apparatus for a radio receiving set, comprising a pair of support members mounted in spaced apart relation on the top of the said set and respectively provided with bushings rotatable about a given axis, a flat oblong tuning dial plate having its end portions mounted on said bushings for a limited degree of rotary movement therewith and having uncovered upper and lower horizontal edge surfaces, a guide-shoe member, a pointer connected to said guide-shoe member, said guide-shoe member abutting said lower surface and said lower surface constituting a guide-path for the said guide-shoe a longitudinal member spaced from the said given axis and arranged with its longitudinal axis parallel to the said axis, a sliding member arranged on said longitudinal member and coupled to said pointer, and means to move said sliding member along said longitudinal member.

4. Tuning apparatus for a radio receiving set, comprising a pair of support members mounted in spaced apart relation on the top of the said set and respectively provided with bushings rotatable about a given axis, a flat oblong tuning dial plate having its end portions mounted on said bushings for a limited degree of rotary movement therewith and having uncovered upper and lower horizontal edge surfaces, a guide-shoe member, a pointer connected to said guide-shoe member, said guide-shoe member abutting said lower surface and said lower surface constituting a guide path for the said guide-shoe, a longitudinal member spaced from the said given axis and arranged with its longitudinal axis parallel to the said given axis, a sliding member arranged on said longitudinal member, a hinge member interconnecting said sliding member and said guide-shoe member, and means to move said sliding member along said longitudinal member, said hinge member comprising a resilient spindle member positioned therein under transverse strain to thereby press said shoe-member against said lower surface.

5. Tuning apparatus for a radio receiving set, comprising a pair of support members mounted in spaced apart axially aligned relation on the top of the said set and respectively provided with bushings rotatable about a given axis, a flat oblong tuning dial plate having its end portions mounted on said bushings for a limited degree of rotary movement therewith, and having uncovered upper and lower horizontal edge surfaces, a first guide-shoe member, a pointer member connected to said guide-shoe member, said pointer member comprising a transverse projecting member provided with a recess, said guide-shoe member abutting said lower surface and said lower surface constituting a guide path for the said guide-shoe, a longitudinal member spaced from the said given axis and arranged with its longitudinal axis parallel to the said given axis, a sliding member arranged on said longitudinal member, a rod member articulately connected to said sliding member and engaging said transverse projecting member, a spring member surrounding said rod member and pressing said guide-shoe member against said lower surface, and means to move said sliding member along said longitudinal member.

MAARTEN JAN GROENENBERG.

REFERENCES CITED

The following references are of record in the file of this patent:

UNITED STATES PATENTS

| Number | Name | Date |
| --- | --- | --- |
| 2,137,684 | Gillard | Nov. 22, 1938 |
| 2,138,359 | Siepke | Nov. 29, 1938 |
| 2,165,416 | Rydstedt | July 11, 1939 |
| 2,173,503 | Strassenburg | Sept. 19, 1939 |
| 2,186,828 | Forstrom | Jan. 9, 1940 |

FOREIGN PATENTS

| Number | Country | Date |
| --- | --- | --- |
| 50,580 | Denmark | Aug. 26, 1935 |
| 207,292 | Great Britain | Nov. 29, 1923 |
| 318,041 | Italy | June 1, 1934 |
| 340,708 | Italy | June 20, 1936 |
| 758,312 | France | May 24, 1933 |
| | (Addition No. 43,791) | |
| 802,031 | France | Aug. 25, 1936 |